United States Patent Office 3,334,671
Patented Aug. 8, 1967

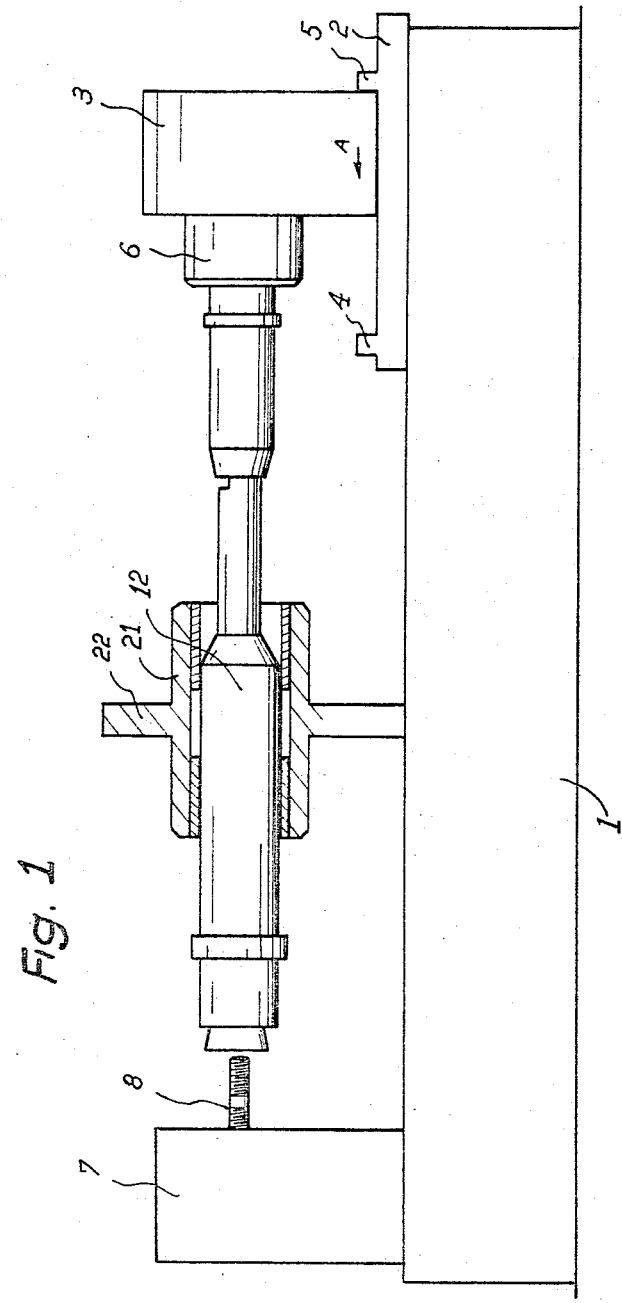

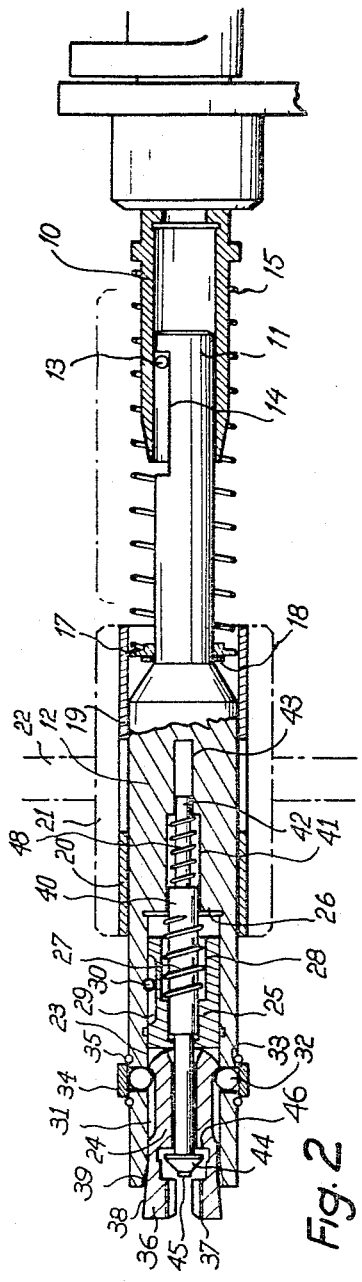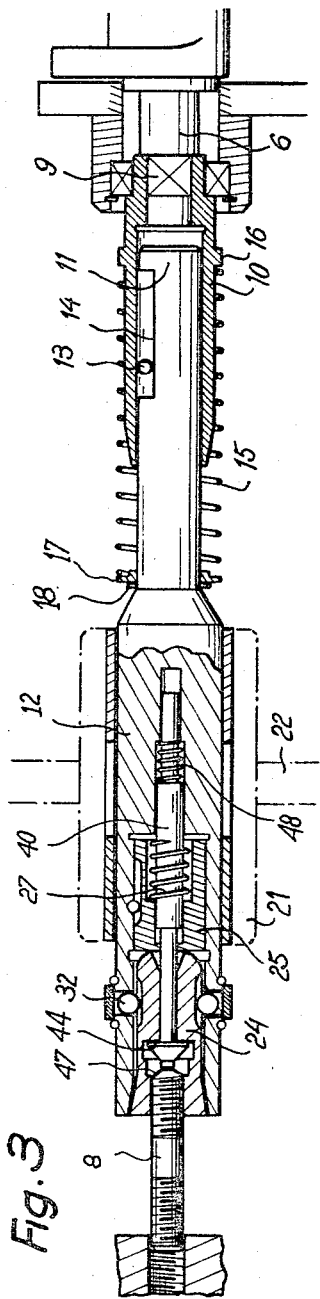

3,334,671
MACHINE FOR SCREWING A THREADED STUD INTO A WORKPIECE
Antoine A. Agostini, Maisons-Laffitte, and André A. Lagriffol, Herblay, France, assignors to Societe Anonyme dite: Simca Automobiles, Paris, France
Filed Oct. 24, 1965, Ser. No. 504,375
Claims priority, application France, Oct. 27, 1964, 992,761
7 Claims. (Cl. 144—32)

The present invention relates to machines for screwing threaded studs with a workpiece.

Machines for this purpose (often called "screw running machines"), utilised at present comprise screwing spindles which are rotated from the driving shafts of a screw head, these spindles being provided with collets, having an internal thread, in which the free ends of the studs are gripped for rotation for screwing them into a threaded hole in any desired workpiece.

However, the spindles used up to the present time, which are of complicated construction and comprise a large number of parts within the collets are not entirely satisfactory for the users.

The improvement in screw running machines according to the invention consists in using a telescopic spindle sliding at its median part in a sleeve fixed to the frame of the machine and in fitting said spindle with simplified collets for gripping the stud comprising only a push rod within said collets and utilising, for driving same, only exteriorly disposed ball-bearings.

Thus there is produced a screw running device, which is not delicate and having a small spindle due to the small number of internal parts used.

On the other hand, the telescopic mounting of the spindles enables studs of different lengths to be screwed or run the same screw cutting head.

Finally, as the machine has multiple spindles, and as the spindle is held against the stud by flexible members, no difficulty can arise in the operation of the machine if one of the studs does not properly screw into the workpiece.

According to the invention, a spindle, one end of which is mounted to slide against the action of a main flexible member into a socket rotatable by one of the shafts of the screw head, is caused to rotate, with said socket due to the provision of a keying member, and slides, at its median part, in a sleeve mounted on a supporting member fixed to the frame of the machine, said spindle comprising at its end opposite that which is engaged in the socket, a collet rotatable with said spindle, by means of driving members.

Other characteristics and advantages of the invention will appear from the following description of an embodiment given solely by way of reference being made to the accompanying drawings in which:

FIGURE 1 shows a schematic view of an improved screw running machine according to the invention, FIGURE 2 shows a longitudinal section through a spindle according to the invention, in the unlocked position, during its travel towards a stud, and FIGURE 3 shows a longitudinal section through the same spindle when tightened on the stud.

The screw running machine shown schematically in FIGURE 1 comprises a frame 1, on which is mounted to slide by means of slides 2, a screw head 3, whose displacement is limited by stops 4, 5 and which comprises a rotary shaft 6.

At the end opposite the screw-running head, the frame 1 carries a threaded part 7 into which it is desired to screw studs 8, which are started by hand.

The rotary shaft 6 of the screw running machine has a square end 9 (FIGURES 2 and 3) by which a socket 10 is secured to said shaft; the end 11 of a spindle body 12 telescopically slides into said socket 10, which spindle is itself rendered rotatable with the socket 10 by a pin 13 fixed to the socket and displaceable against a flat part 14 formed at the end 11 of the spindle body.

A flexible member 15, constituted by a helical spring in abutment on the one hand against a shoulder 16 conforming in shape to the socket 10 and on the other hand against a ring 17 itself supported on a shoulder 18 of the spindle body 12, tends to push the spindle 12 against the workpiece 7.

In its median part, the spindle body 12 is mounted to slide in bearings 19, 20 held in a sleeve 21 secured to a supporting member 22 itself fixed to the frame 1 of the screw running machine (FIGURES 1, 2).

At its end opposite the socket 10, the spindle body 12 has a cylindrical housing 23 in which are mounted to slide a pair of collets 24 and a sleeve 25 disposed between the collets and the base 26 of the housing 23. This sleeve 25 is subjected to the action of a flexible member 27, constituted by a helical spring in abutment on the one hand against the base of the housing 23 and on the other hand against the base of a housing 28 on the sleeve 25, so as to push said sleeve against the collets 24. The sleeve 25 is rotatable with the spindle body 12 by a flat end 29 formed on the sleeve 25, moving against a pin 30 fixed to the spindle body 12. The collets 24 which are rotatable by the spindle body 12, have grooves 31 in which ball bearings 32 are displaced, said bearings being disposed in housings 33, made in the tubular portion of the spindle body 12, these ball bearings being held in the housings by an outer ring 34 fixed to the spindle body 12 by flexible keepers 35.

The jaws 36 of the collets 24 which are internally threaded at 37, for gripping the end of the stud 8, have a tapered external surface 38 so as to co-operate with a tapered inlet 39 of the housing 23 for tightening the jaws when the collets are engaged in the housing 23.

A push rod 40 axially sliding in a housing 41 of the spindle body 12 and subjected to the action of a spring 48 has a cylindrical guiding shank 42, sliding in a bore 43 of the spindle 12 and opening out concentrically into the housing 41.

On this push rod 40 are engaged the collets 24 and sleeve 25, so that said collets are held in the shaft of the spindle by the push rod, this being necessary in a horizontal spindle in order to avoid the threads of the stud deteriorating and in order to permit a good engagement of the collets in the latter.

In the collets 24, the push rod 40 has a head 44 which may abut the base of the housing 46 constituted by the jaws 36, said head being situated near one end 45 of the push rod intended to abut the end 47 of the stud 8.

The operation of the screw running machine is as follows: the stud 8 is started in the workpiece 7 by hand, the head 3 of the screw running machine is then pulled back against the rear stop 5, as shown in FIGURE 1. The spindle is checked and is then located in the position shown in FIGURE 2, i.e. with the flexible members 15, 27 and 48 slackened and the collets 24 open.

The screw head 3 then advances in the direction of the arrow A, whilst the spindle is still in check so that the end 45 of the push rod 40 comes into contact with the end 47 of the stud 8.

The spindle is advanced in the same direction and the push rod 40 is forced into the bore 43, the spring 15 having a greater tension than the spring 15 having a greater tension than the spring 48; the head 44 of the push rod comes into contact with the base 46 of the collets 24 and drives the latter as well as the sleeve 25 both of which slide into the cylindrical housing 23 of the spindle body 12 whilst compressing the spring 27. During this movement, the pair of collets 24, by penetrating into the housing 23, grips the thread of the stud 8, by the combined action of the tapered part 39 of the spindle body 12 on the tapered part 36 of the collets 24.

The head 3 of the machine is displaced in the direction of the arrow A, the two flexible members 27 and 48 being compressed; the flexible member 15 whose tension is greater than these two latter, is also compressed (FIGURE 3) and the end 11 of the spindle 12 slides into the socket 10 guided by the pin 13 which is displaced against the flat part 14 of the spindle.

As soon as the head 3 of the machine comes into contact with the stop 4, the spindle is set into rotation so as to proceed with the screwing of the stud 8 into the workpiece 7, until a predetermined torque load measured by a torque limiting device (not shown) is obtained. The rotation is then automatically stopped.

The automatic return of the head 3 of the machine causes the slackening of the flexible member 15, whose tension is greater than the sum of the tensions of the flexible members 27 and 48.

As soon as the flexible member 15 is completely slackened, the flexible members 48 and 27 react respectively on the push rod 40 and the collets 24, bringing about the opening of the latter, which are flexible.

As the spindle is disengaged from the stud 8 screwed on the part 7, the head 3 of the machine continues its return movement until it comes into contact with the stop 5 for a new screw running operation.

We claim:

1. A machine for screwing a threaded stud into a workpiece, comprising a slidably movable head mounted on a frame, said head having at least one rotatable shaft therein; a socket mounted on said rotatable shaft so as to be rotated therewith; a spindle having one end slidably and nonrotatably carried within said socket; a first flexible member between said socket and said spindle acting to separate said socket and said spindle; a sleeve mounted on a support fixed to said frame and having a plurality of bearing members to rotatably and slidably support said spindle; and a set of collets disposed in the other end of said spindle for holding a threaded stud, whereby said collets engage and disengage said stud in response to slidable movement of said head 2. The machine of claim 1, wherein said collets are carried in a cylindrical housing with a cylindrical sleeve disposed between the base of said housing and said collets, said sleeve being subject to the action of a second flexible member abutting against the base of said housing and tending to push said sleeve and said collets.

3. The machine of claim 2, wherein said cylindrical housing has a tapered inlet in a camming engagement with said collets to cam same into said engaging and disengaging positions in response to slidable movement of said head.

4. The machine of claim 2, further comprising a push rod which is coaxially, slidably mounted within said spindle, said collets and said cylindrical sleeve and a third flexible member acting on said push rod to push the end thereof disposed between the jaws of said collets against the end of said stud; said push rod having a head which abuts the base of said collets to drive the latter into a tightening position when said stud acts against said head.

5. The machine of claim 4, in which the tension of said first flexible member is greater than the sum of the tensions of said second and third flexible members.

6. The machine of claim 5, further comprising ball bearings engaged in grooves formed on the collets and holes formed in said spindle body; said ball bearings being held in place by a ring fixed around said spindle.

7. The machine of claim 1, further comprising a pin member fixed to said socket and acting within a groove in said spindle to prevent relative rotation between said spindle and said socket and to limit axial movement of said spindle.

References Cited

UNITED STATES PATENTS

| | | | |
|---|---|---|---|
| 1,320,375 | 11/1919 | Brown | 144—32 |
| 1,807,265 | 5/1931 | Walker | 81—535 |
| 2,086,167 | 7/1937 | Lamb | 81—535 |
| 2,435,137 | 1/1948 | Geertsema | 81—535 |
| 2,531,456 | 11/1950 | McKean | 81—535 |
| 2,743,639 | 5/1956 | Lynch | 81—535 |
| 3,258,042 | 6/1966 | Ruminsky | 144—32 |
| 3,266,537 | 8/1966 | Ulbing | 144—32 |

FOREIGN PATENTS

| | | |
|---|---|---|
| 1,229,231 | 3/1960 | France. |

WILLIAM W. DYER, Jr., *Primary Examiner.*

R. J. ZLOTNIK, *Assistant Examiner.*